United States Patent
Kondo et al.

[11] Patent Number: 5,972,517
[45] Date of Patent: Oct. 26, 1999

[54] FILTER FOR DISPLAY DEVICE

[75] Inventors: Hirofumi Kondo, Miyagi; Hideaki Hanaoka, Kanagawa, both of Japan

[73] Assignee: Sony Corporation, Tokyo, Japan

[21] Appl. No.: 08/965,401

[22] Filed: Nov. 6, 1997

[30] Foreign Application Priority Data

Nov. 7, 1996 [JP] Japan ................................. 8-294755

[51] Int. Cl.$^6$ ............................................... B32B 17/00
[52] U.S. Cl. ..................... 428/446; 428/429; 428/432; 428/447; 428/448
[58] Field of Search ..................... 428/429, 432, 428/447, 448, 446

[56] References Cited

U.S. PATENT DOCUMENTS 5,570,161 10/1996 Andrews et al. .................... 355/215

FOREIGN PATENT DOCUMENTS 0 203 730 12/1986 European Pat. Off. .
0 314 413  5/1989 European Pat. Off. .
WO 96/11289 4/1996 WIPO .

OTHER PUBLICATIONS

K. Trojan, et al,: Network Modification of DLC Coatings to Adjust a Defined Surface Energy; Phys. Stat. Sol. (a) Applied Research; vol. 145, No. 2; Oct. 16, 1994; pp. 575–585; XP 000601333.

*Primary Examiner*—Timothy M. Speer
*Attorney, Agent, or Firm*—Hill & Simpson

[57] ABSTRACT

The present invention is a filter for a display device having a substrate 1, an outermost layer inorganic film provided on the substrate 1 through or not through one or more other films and a surface modified film covering the surface of the outermost layer inorganic film and having a polar term component $\gamma^p$ of the surface energy of not more than 2.0 erg/cm$^2$. The present invention provides a filter for a display device having an antireflection property superior in stain resistance, scratch resistance, processing resistance, etc. and suitable even when used as a front panel of a CRT or other display device.

15 Claims, 1 Drawing Sheet

FILTER FOR DISPLAY DEVICE

BACKGROUND OF THE INVENTION

1. Field of the Invention

The present invention relates to a filter for a display device having an antireflection property superior in stain resistance, scratch resistance, processing resistance, etc. and further relates to a filter able to be used as the front panel of a CRT.

2. Description of the Related Art

When viewing an object through a transparent material, it is bothersome if the reflected light is strong and the reflected image is clear. For example, in eyeglass lenses, "ghosts", "flares", and other reflected images occur and give an unpleasant feeling to the eye. Further, in telescopes etc., a problem occurs that the object viewed cannot be discerned due to the light reflected on the surface of the glass.

In the past, to protect against reflection, a substance having a reflectance different from the substrate has been coated on the surface by vacuum deposition etc. In this case, to bring out the maximum antireflectance effect, it is known to be important to properly select the thickness of the substance covering the substrate.

For example, selection of the optical thickness of the substance of the reflectance lower than the substrate to be ¼ of the wavelength covered or an odd multiple of the same is known to give the smallest reflectance, that is, an extremely large transmittance.

Here, the optical thickness is given by the product of the reflectance of the coated shaped material and the thickness of the coating. Further, it is possible to form a plurality of layers of antireflectance films. Several proposals have been made regarding the selection of the thickness in this case (Kagaku Gijutsu Contact (Optical Technology Contacts), Vol. 9, No. 8, p. 17 (1971)).

On the other hand, the methods for forming antireflection films comprised of multiple layers satisfying the condition of the optical thickness using a liquid composition are described in Japanese Unexamined Patent Publication (Kokai) No. 58-46301, Japanese Unexamined Patent Publication (Kokai) No. 59-49501, and Japanese Unexamined Patent Publication (Kokai) No. 59-50401. In recent years, the advantages of light weight, safety, ease of handling, and the like have been used to produce and commercialize optical products using a plastic substrate and having an antireflectance. Further, most use configurations of films having a silicon dioxide surface layer film.

SUMMARY OF THE INVENTION

The antireflection film formed by the vacuum deposition method is coated by a material mainly comprising an inorganic oxide or inorganic halide. In the case of a plastic substrate, the antireflection film inherently has a high surface hardness, but is susceptible to staining by hand marks, finger marks, sweat, hair liquids, hair sprays, etc. These stains are difficult to remove. Further, since the surface slip is poor, there is the problem that the scratches become thicker. Further, since the wettability with respect to water is large, when drops of water strike the surface, they will spread out widely and over a large surface area of the eyeglass lens etc. to cause an object viewed to appear distorted.

To provide a hard surface hardness to the antireflection films described in Japanese Unexamined Patent Publication (Kokai) No. 58-46301, Japanese Unexamined Patent Publication (Kokai) No. 59-49501, and Japanese Unexamined Patent Publication (Kokai) No. 59-50401, it is necessary to include in the outermost surface layer film at least 30 wt % of an inorganic substance such as silica particles, but an antireflection film obtained from such a film composition has problems in that it is poor in surface slip and is easily scratched by abrasion by a cloth etc.

Various surface treatment agents have been proposed and marketed for the purpose of alleviating these problems, but all of these dissolve in water or various solvents, so temporarily give functions, lack permanence, and are poor in durability. Further, Japanese Unexamined Patent Publication (Kokai) No. 3-266801 reports the formation of a fluorine-based resin layer for imparting water repellency. With these fluorine-based resins, however, while the water repellency is indeed increased, satisfactory results are not obtained with respect to friction and abrasion.

The present invention was made in consideration of this situation and has as its object to provide a filter for a display device which has an antireflection property superior in stain resistance, abrasion resistance, processing resistance, etc. and suitable even when used as a front panel of a CRT or other display device.

The present inventors engaged in intensive studies for solving the above problems and as a result completed the invention described below.

That is, to achieve the above object, the filter for a display device according to the present invention is characterized by having a substrate, an outermost layer inorganic film provided on the substrate through or not through one or more other films, and a surface modified film covering the surface of the outermost layer inorganic film and having a polar term component $\gamma^p$ of the surface energy of not more than 2.0 erg/cm².

In this case, it is preferable that said surface modified film be formed from a coating composition containing alkoxysilane compound having a water repellent group of the following general formula (1):

$$R_f\{X\text{-}Si(OR_1)_3\}_j \quad (1)$$

(wherein, $R_f$ is a water repellent group, X is a bivalent organic group, $R_1$ is an unsubstituted or substituted monovalent hydrocarbon group, and j is 1 or 2).

Further, preferably said surface modified film is formed from a coating composition containing a silicone compound of the following general formula (2):

$$Y-\underset{\underset{R_2}{|}}{\overset{\overset{R_2}{|}}{Si}}O(SiO)_n\underset{\underset{R_2}{|}}{\overset{\overset{R_2}{|}}{Si}}-Y \quad (2)$$

(wherein, Y is a polar group, $R_2$ is a substituted or unsubstituted monovalent hydrocarbon group, and n is an integer of 1 or more).

The present inventors conducted repeated studies on the large changes in properties of a surface modified film obtained when treating the surface of an antireflection film comprised mainly of silicon oxide on a substrate with an alkoxysilane compound having a water repellent group or a silicone compound depending on the type of the compounds used, the film forming methods, etc. As a result, they discovered that by making the polar term component $\gamma^p$ of the surface energy of the antireflection film not more than 2.0 erg/cm², the surface modified film formed on the surface of the antireflection film became superior in stain resistance, slip, abrasion resistance, resistance to hand marks, etc. and is stable in those properties over the long term and thereby perfected the present invention.

That is, by making the surface energy (surface tension) smaller, in general a water repellency is given and the resistance to staining by water is improved. The surface energy, however, includes a dispersion term component derived from the Van der Waals force, a polar term component relating to the Coulomb electrostatic force, a term based on the hydrogen bonds, other intermolecular forces such as a metal bonding force. That is, in general, even if water repellency is given, the effect on the properties differs tremendously according to which intermolecular force is reduced.

In general, water repellency is improved by coating with a compound containing fluorine. As shown in the later explained embodiments, the water repellency differs tremendously according to the type of the compound. Further, even if the same compound is coated, differences occur in the surface energy due to the time it is allowed to stand after coating. Further, it differs depending on the presence of a catalyst.

Therefore, by further analyzing the surface energy, it is possible to develop an antireflection film superior in water repellency, superior in tribology, and able to solve the problems of abrasion resistance and frictional properties. Note that the method of measurement of the polar item component $\gamma^p$ of the surface energy is explained later.

To obtain the surface modified film having such a surface energy, it is possible to coat an antireflection film comprised mainly of silicon oxide with an alkoxysilane compound having a water repellent group shown in the above formula (1) or a coating composition containing a silicone compound shown in formula (2).

BRIEF DESCRIPTION OF THE DRAWINGS

These and other objects and features of the present invention will become clearer from the following description of the preferred embodiments given with reference to the attached drawings, in which.

DESCRIPTION OF PREFERRED EMBODIMENTS

Below, the present invention will be explained in further detail based on embodiments.

Figure 1:
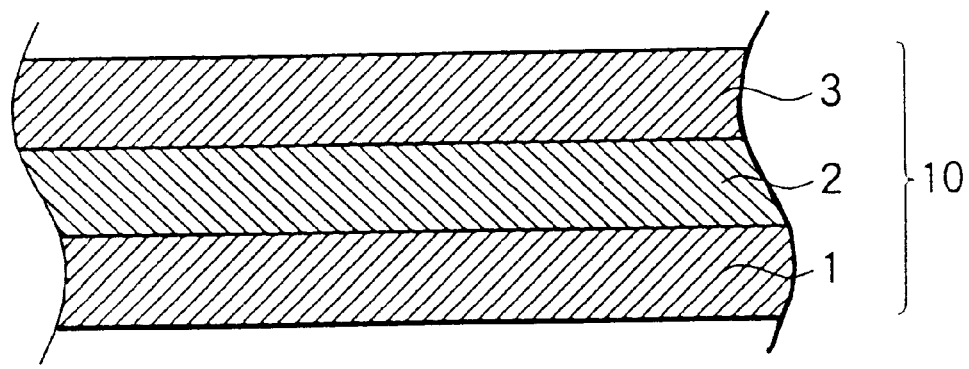
FIG. 1 is a cross-sectional view of the cross-sectional structure of the filter for a display device according to an embodiment of the present invention.

FIG. 1 shows the cross-sectional structure of the filter for a display device according to the first embodiment of the present invention.

The filter 10 for a display device in the embodiment shown in FIG. 1 is comprised of a plastic or glass transparent substrate 1 on one surface of which is provided an antireflection film 2. A surface modified film 3 is formed on the top surface of this.

Figure 2:
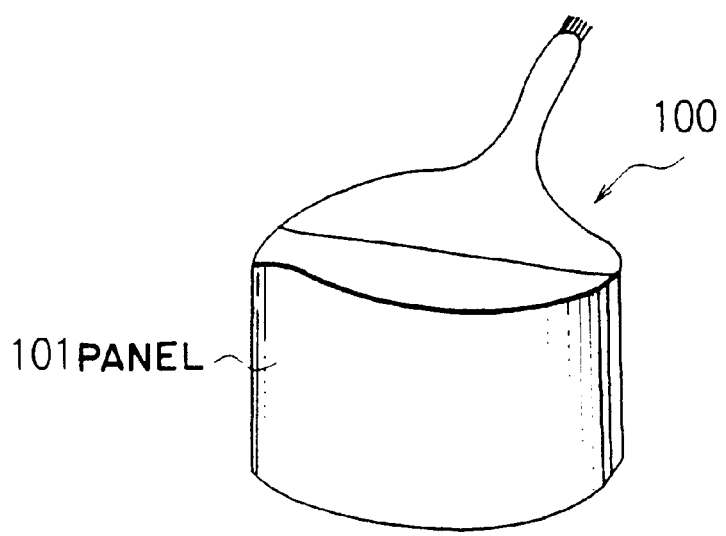
FIG. 2 is a schematic perspective view of a CRT according to an embodiment of the present invention.

The filter 10 according to the present embodiment is for example attached to the surface of a panel 101 of a cathode ray tube (CRT) 100 shown in FIG. 2 by an adhesive layer. The adhesive for bonding the substrate 1 of the filter 10 to the panel 101 is not particularly limited. Various known ones may be used. In general, however, an ultraviolet curing resin-based adhesive is used. The reflectance of the cured layer is similar to the reflectance of the above panel. For example, use may be made of a composition containing 10 wt % of a bisphenol A type epoxy (metha)acrylate of a molecular weight of at least 550, 20 wt % of urethane (metha)acrylate, 70 wt % of a hydroxy group-containing mono(metha)acrylate, 3 percent of a photo polymerization initiator, and several percent of other additives.

In the present invention, the substrate 1 of the filter 10 shown in FIG. 1 is not particularly limited. As a plastic, use may be made of any substrate comprised of an organic polymer, but in view of the transparency, reflectance, dispersion, and other optical properties and the shook resistance, heat resistance, durability, and other properties, polymethyl methacrylate, methyl methacrylate, and other alkyl(metha)acrylates, (metha)acrylic resins, copolymers with vinyl monomers such as styrene; polycarbonate resins such as polycarbonate, diethylene glycol bisallyl carbonate (CR-39); heat curing (metha)acrylic resins such as homopolymers or copolymers of (brominated)bisphenol A with di(metha)acrylate, polymers or copolymers of (brominated)bisphenol A with urethane modified mono (metha)acrylate monomers; polyesters, particularly polyethylene terephthalate, polyethylene naphthalate, and unsaturated polyesters; acrylonitrile-styrene copolymer, polyvinyl chloride, polyurethane, epoxy resins, etc. are preferred. Further, use of an aramid based resin is also possible considering heat resistance. In this case, the upper limit on the heating temperature becomes at least 200° C. and the range of temperature can be expected to become wider.

The above plastic substrate surface may be covered by a hard coat or other coating material. This coating material present under the antireflection film comprised of an inorganic substance, explained later, can improve the physical properties such as the adhesion, hardness, chemical resistance, durability, dyeability, etc.

To improve the hardness, it is possible to use various types of materials known as films for giving a high hardness to a plastic surface. For example, it is possible to use the technology disclosed in Japanese Examined Patent Publication (Kokoku) No. 50-28092, Japanese Examined Patent Publication (Kokoku) No. 50-28446, Japanese Examined Patent Publication (Kokoku) No. 51-24368, Japanese Unexamined Patent Publication (Kokai) No. 52-112698, and Japanese Examined Patent Publication (Kokoku) No. 57-2735. Further, use may be made of a cross-linked acrylic formed using (metha)acrylic acid ester and pentaerythritol or another cross-linking agent, an organopolysiloxane based one, etc. These may be used alone or in suitable combinations.

Further, the substrate 1 is not limited to a plastic and for example may be a glass. The glass may be a noncrystalline solid mainly comprising silicic acid, boric acid, phosphoric acid, etc. For example, mention may be made of soda glass, lead glass, hard glass, quartz glass, liquid crystal glass, etc. (for example, Kagaku Binran Kisohen (Chemical Handbook-Fundamentals), p. T-537, Japanese Society of Chemical Engineers ed.) For a CRT, silicic acid glass containing strontium or barium is preferably used. For a liquid crystal display device, a nonalkali glass is preferably used.

The antireflection film 2 formed over the substrate 1 is one having a single layer or multiple layer and may be a combination of various types. In particular, when a multiple layer structure, the film configuration of the substance forming the layer below the surface layer film may be determined based on suitable tests etc. in accordance with the required performances, for example, the heat resistance, antireflection, reflected light color, durability, surface hardness, etc.

As the film-forming method of the various inorganic substances including silicon dioxide forming these antireflection films, there are vacuum deposition, ion plating, sputtering, and other types of PVD (physical vapor deposition) methods.

As the inorganic substance suited for the above PVC method used in obtaining the antireflection film, in addition to $SiO_2$, mention may be made for example of $Al_2O_3$, $ZrO_2$, $TiO_2$, $Ta_2O_5$, $TaHf_2$, SiO, TiO, $Ti_2O_3$, $HfO_2$, ZnO, $In_2O_3$/$SnO_2$, $Y_2O_3$, $Yb_2O_3$, $Sb_2O_3$, MgO, $CeO_2$, and other inorganic oxides.

Note that the outermost surface layer film of the antireflection film formed by the PVD method is preferably mainly comprised of silicon dioxide. When other than silicon dioxide, not only is a sufficient surface hardness not obtained, but also there is a liability that the object of the present invention, that is, the improvement of the stain resistance and scratch resistance and the durability of these performances will not appear. The present invention, however, relates to the configuration of the surface modified film covering the surface of the antireflection film, so does not particularly limit the material of the outermost surface layer film of the antireflection film and therefore may also be configured by other than silicon dioxide.

The thickness of the outermost surface layer film of the antireflection film should be determined by the performances required other than antireflection effect, but for the purpose of bringing out the antireflection effect to the maximum extent, selection of the optical thickness of the surface layer film to be ¼ of the wavelength covered or an odd multiple of the same is preferable from the viewpoint of giving the smallest reflectance, that is, an extremely large transmittance.

On the other hand, the configuration of the bottom layer portion of the surface film is not particularly limited. That is, it is possible to form the surface film directly on the substrate, but to achieve a more remarkable antireflection effect, it is effective to provide one or more layers of films with a higher reflectance than the surface film on the substrate. Several proposals have been made regarding the selection of thickness of these multiple layers of antireflection film and refractive index (for example, Optical Technology Contact Vol. 9, No. 8, p. 17 (1971)).

Further, it is possible to provide the bottom layer portion with a carbon sputter film, carbon CVD film, or other inorganic light transmitting film.

In the present invention, however, the surface of the single or multiple layer antireflection film 2 explained above is covered by a surface modified film 3 having a specific surface energy. The polar term component $\gamma^P$ of the surface energy of the surface modified film 3 is not more than 2.0 erg/cm2.

In general, the surface energy (surface tension) $\gamma^T$ of the substance forming the surface is mainly the sum of the dispersion force component $\gamma^d$ and the polar term component $\gamma^P$ as shown in equation (3).

$$\gamma^T = \gamma^d + \gamma^P \tag{3}$$

Further, the following relationship stands between the surface energy of the solid surface and the surface energy of the solvent.

$$(1+\cos\theta)\gamma_L^T = 2(\gamma_L^d \gamma_S^d)^{1/2} + 2(\gamma_L^P + \gamma_S^P)^{1/2} \tag{4}$$

Here, $\theta$ is the contact angle (°), $\gamma_L^T$ is the surface energy of the solvent, $\gamma_L^d$ is the dispersion force component of the surface energy of the solvent, $\gamma_L^P$ is the polar item component of the surface energy of the solvent, $\gamma_S^P$ is the polar item component of the surface energy of the solid. The units of the energy are all erg/cm².

By using two types of solvents with known dispersion force components and polar term components to measure the contact angles and solving the simultaneous equations, the $\gamma_S^d$ and $\gamma_S^P$ components of the solid surface are found. For example, the dispersion force component and polar term component of the water and methylene iodide used for finding the dispersion force component and polar term component of the surface modified film in the later explained embodiments are shown below (J. Adhesion, Vol. 2, p. 66 (1970)).

|  | $Y_L^d$ | $Y_L^P$ | $Y_L^T$ |
|---|---|---|---|
| Water | 21.5 | 51.0 | 72.5 |
| Methylene iodide | 48.5 | 2.3 | 50.8 |

In the present invention, the polar term component $\gamma_S^P$ of the surface energy of the surface modified film 3 is not more than 2.0 erg/cm². If the polar term component exceeds this, the water repellency becomes smaller and the properties of the stain resistance, surface slip, abrasion resistance, resistance to hand marks, etc. become inferior. Further, the durability against wiping with ethanol etc. deteriorates and the object of the present invention cannot be achieved. Preferably, the value is not more than 1.5 erg/cm². Further, the value of the dispersion component $\gamma_S^d$ of the surface energy of the surface modified film calculated by the above technique is not particularly limited, but from the viewpoint of the overall surface energy, it is preferably not more than 20 erg/cm², particularly not more than 13 erg/cm².

To obtain a surface modified film having such a surface energy, the surface modified film is preferably formed from a fluorine based, silicone based, or hydrocarbon based organic compound. In particular, it is preferably formed using a coating composition containing a water repellent group-containing alkoxysilane compound of the following general formula (1) or a silicone compound shown in the following general formula (2), but is not limited to these:

$$R_f\{X-Si(OR_1)_3\}_j \tag{1}$$

(wherein, $R_f$ is a water repellent group, X is a bivalent organic group, $R_1$ is an unsubstituted or substituted monovalent hydrocarbon group, and j is 1 or 2).

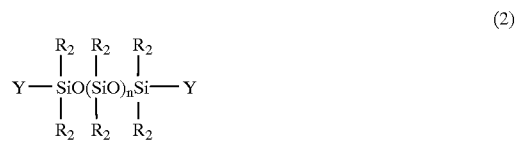

$$\tag{2}$$

(wherein, Y is a polar group, $R_2$ is a substituted or unsubstituted monovalent hydrocarbon group, and n is an integer of 1 or more).

As the water repellent group of the alkoxysilane compounds shown in the above formula (1) having water repellent groups, mention may be made for example of a perfluoroalkyl group, perfluoropolyether group, partial fluorinated alkyl group, or other fluorine-containing organic group, hydrocarbon group, etc.

As the perfluoroalkyl group, for example, ones shown in the following general formula (5) may be exemplified.

$$F(CF_2)_n— \quad (5)$$

The number n of carbon atoms is preferably in the range of 6 to 20. If the number of carbon atoms is smaller than this, the durability becomes poorer, while if over this, the yield at the time of synthesis is poor and not practical in some cases.

The perfluoropolyether group is not particularly limited, but include various long chain perfluoropolyether groups. Preferably, there are monovalent or bivalent perfluoropolyethers having $C_1$ to $C_3$ perfluoroalkyloxy groups as repeating units. As a monovalent perfluoropolyether, specifically, there are for example the following:

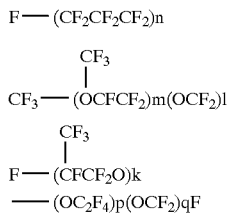

Further, as the bivalent perfluoropolyether group, there are for example the following:

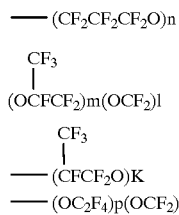

Note that l, m, n, k, p, and q in the above chemical formula show integers of at least 1. The molecular structure of the perfluoropolyether given above is not limited to those illustrated.

Further, as the partial fluorinated hydrocarbon group used as the water repellent group $R_f$, mention may be made of a molecular structure shown in the following general formula (6):

$$F(CF_2)_v(CH_2)_w— \quad (6)$$

The number v of carbon atoms of the partial fluorinated hydrocarbon group is preferably 3 to 12, the length w of the alkylene chain is preferably 6 to 30, and the total number v+w of the carbon atoms is preferably 10 to 33.

Further, as the hydrocarbon group of the water-repellant group, mention may be made of a long chain alkyl group having 10 or more carbon atoms for example.

The X in the above formula (1) is a bivalent organic group. For example, mention may be made of an unsubstituted or substituted bivalent hydrocarbon group, in particular a methylene group, ethylene group, propylene group, butylene group, or other alkylene group.

Further, the $R_1$ in the above formula (1) is an unsubstituted or substituted monovalent hydrocarbon group constituting an alkoxy group. The number of carbon atoms is not particularly limited. For example, mention may be made of a $C_1$ to $C_5$, for example, methyl group, ethyl group, propyl group, isopropyl group, or other alkyl group. Note that in so far as the flexibility or fluctuation of the chain of carbon atoms is not impaired, it may be something partially having an unsaturated bond, characteristic group, aromatic group, or other cyclic structure. Further, it may be one having a short chain branched chain or side.

Further, the molecular weight of the alkoxysilane compound of the general formula (1) is not particularly limited, but from the viewpoint of safety, easy of handling, etc., use is made of a compound of a number average molecular weight of 500 to 10,000, more preferably 500 to 2000.

On the other hand, the Y of the terminal end of the silicone compound shown in general formula (2) is a polar group. Mention may be made for example of an amino group, hydroxy group, carboxy group, epoxy group, ester group, alkoxy group, metacryloxy group, imide group, etc.

Further, $R_2$ is a substituted or unsubstituted monovalent hydrocarbon group. As a substituted monovalent hydrocarbon group, mention may be made of a fluorinated hydrocarbon group. In particular, when considering the water repellency, a perfluoromethyl group or other fluorinated hydrocarbon is preferred.

The molecular weight of such a silicone compound is not particularly limited, but one with a number average molecular weight of 1000 to 10,000 or so is preferably used.

Further, in the present invention, to obtain the above surface energy, it is possible to use an alkoxysilane compound of the above general formula (1) alone or in mixtures of two or more types. Further, it is possible to use the same together with the silicone compound of the above general formula (2). For example, it is effective to mix into the alkoxysilane compound having a perfluoropolyether group an alkoxysilane compound having a perfluoroalkyl group, partially fluorinated alkyl group, or hydrocarbon group or a silicone compound of formula (2). The ratios of mixture may be determined from the viewpoint of the surface energy.

The thickness of the surface modified film formed by such a compound is also not particularly limited, but from the balance between the antireflection property and the stationary contact angle with water and the relationship with the surface hardness, it is preferably 0.1 nm to 100 nm, more preferably not more than 10 nm, specifically about 0.5 nm to 5 nm. Even in the case of a thin film of about 10 nm, the effects on the tribology such as the lubrication properties of the surface energy are not known. However, in a thin film material on silicon dioxide, since the thickness is small, the demands on durability are tough. Therefore, it is important to discover the surface energy having an effect on the lubrication properties and improve the durability. The present invention was made from this viewpoint.

As the method for coating, it is possible to use the various types of methods used in normal coating work, but from the viewpoints of the uniformity of the antireflection effect and the control of the reflected interference colors, spin coating, dipping coating, curtain roll coating, etc. are preferably used. Further, from the viewpoint of work efficiency, the method of impregnating paper, cloth, or another material with the solution and coating by film casting is also preferably used.

In this coating work, the compound of the general formula (1) and the compound of the general formula (2) are diluted by an ordinary volatile solvent for use as a coating composition. The solvent used is not particularly limited, but should be decided upon considering the stability of the composition in use, the wettability with the coated surface, that is, the outermost surface of the antireflection film, typically a silicon dioxide film, the volatility, etc. In the present invention, methanol, ethanol, isopropanol, n-butyl alcohol, i-butyl alcohol, sec-butyl alcohol, sec-amyl alcohol, and other alcohol based solvents are particularly preferable. These may be used alone or in mixtures of two or more types. Further, it is possible to mix a hydrocarbon based solvent with the alcohol based solvent to make a mixed solvent. As such a hydrocarbon based solvent, use may be made of n-hexane, n-heptane, or other paraffins, benzene, toluene, or other aromatic hydrocarbons, cyclohexane or other cycloparaffins with melting points in the range of 50 to 120° C. alone or in mixtures of two or more types. In addition, use may be made of a fluorinated hydrocarbon based solvent. For example, mention may be made of perfluoroheptane, perfluoroctane, perfluoropolyethers such as those of the brandnames SV-100, SV-135, etc. made by Autdimont Co., perfluoroalkanes such as the FC series made by Sumitomo 3M, etc. Among these fluorinated hydrocarbon based solvents, ones with melting points in the range of 70 to 240° C. may be selected. These may be used alone or in mixtures of two or more types.

The degree of dilution by the diluting solvent at the time of preparing the coating composition of the compound of the general formulas (1) and (2) is not particularly limited, but for example preparation to a concentration of 0.1 to 5.0 wt % is suitable.

Further, it is also possible to add to the coating solution, when necessary, an acid or base as a reaction catalyst. As the acidic catalyst, use may be made of sulfuric acid, hydrochloric acid, nitric acid, phosphoric acid, acidic kaolin, iron oxide, boric acid, trifluoroacetic acid, etc. Further, as the basic catalyst, use may be made of ammonia water or other amine based compounds, sodium hydroxide, potassium hydroxide, lithium hydroxide, and other alkali metal hydroxides, etc. The amount of these catalysts added is preferably 0.001 to 1 mmol/liter. In addition to or on top of these acids and bases, it is possible to add a phosphoric acid ester based catalyst or acetyl acetone or other β-diketone to enhance the catalytic effect. The addition of such a catalyst reduces the polar term component $\gamma^p$ of the surface energy and facilitates the achievement of the object of the present invention. The amount of the carbonyl compound added may be 0.1 to 100 mmol/liter.

In coating the composition containing the compound of the formula (1) and/or (2) according to the present invention, it is preferable that the surface of the antireflection film to be coated on be cleaned. In this cleaning, use may be made of removal of stains by a surfactant, stripping by an organic solvent, steam cleaning by a fluorine-based gas, etc. Application of various types of pretreatment for the purpose of improving the adhesion and the durability is also effective. As particularly preferable methods, mention may be made of treatment by activating gas or chemical treatment by an acid, alkali, etc.

The drying conditions after the coating may be either natural drying or forced drying. The polar term component of the surface energy of the obtained surface modified film changes depending on the drying conditions, so it is possible to set the temperature, humidity, and other drying conditions from the viewpoint of the surface energy as well.

The surface modified film of the present invention may give abrasion resistance etc. to the silicon oxide surface in addition to the stain resistance, scratch resistance, and processing resistance. Therefore, the filter for a display device of the present invention is more resistant to stains than the ordinary antireflection film and any stain caused does not stand out. Further, there are the advantages that stains can be easily removed or, due to the good surface slip, the surface is hard to scratch. In addition to these performances, there is durability against abrasion as well.

Note that the present invention is not limited to the above embodiment and can be modified in various ways within the scope of the invention.

For example, in the above embodiment, the filter 10 was used attached to the panel 101 of the CRT 100 shown in FIG. 2. The filter 10 according to the present invention, however, does not have to be used attached to the surface of the panel 101. It may also be a filter of a type which can be freely attached to and detached from the front of the panel 101.

Further, the panel of the display device to which the filter 10 is attached is not limited to a panel having curvature such as a CRT. It also includes the panel of a liquid crystal display device or plasma display or other flat screen display device and also panels of various display devices. The filter according to the present invention may be attached to the panels of these display devices by an adhesive etc. or may be attached in a detachable manner. When attached in a detachable manner, a frame is attached at the outer periphery of the filter according to the present invention and the filter according to the present invention is attached to that frame.

Further, the multilayer structure of the filter according to the present invention is not limited to the embodiment shown in FIG. 1. Various multilayer structures may be considered.

EXAMPLES

Below, the present invention will be explained in more detail using examples, but the present invention is not limited by these examples in any way. Note that in the examples, "parts" indicate parts by weight.

Example 1

(1) Preparation of Antireflection Film

As the substrate, use was made of a transparent polyethylene terephthlate (PET) film of a thickness of 100 μm. One surface of the PET film was given a hard coat to secure surface hardness in advance. On top of this, ITO (Indium-tin Oxide) of a thickness of 120 nm was pre-deposited by a vacuum deposition process as an antireflection film. On top of this, $SiO_2$ was formed to a thickness of 70 nm by vapor deposition. Note that the "hard coat treatment" spoken of here means in general to coat an acrylic cross-linking resin stock and cross-link and cure the same by ultraviolet rays, and electron beam, etc. or coating a silicone-based, melamine-based, or epoxy-based resin stock and curing the same by heat.

(2) Preparation of Coating Composition Containing Alkoxysilane Compound Having Perfluoropolyether Group 200 parts of methyl alcohol were added to and mixed with 4 parts of an alkoxysilane compound having a perfluoropolyether group of compound 1 of Table 1, 1 cc of acetyl acetone and 0.01 cc of concentrated hydrochloric acid were added to make a uniform solution, then this was filtered by a membrane filter to obtain a coating composition.

(3) Coating and Drying

A coating composition prepared by the above (2) was coated on the surface of the antireflection film obtained in the above (1) at a takeup speed of 5 cm/min, dried under the drying conditions 4 of Table 2 (ordinary temperature and ordinary humidity (25° C., 60% RH)) for 24 hours to obtain an optical product having an antireflection property. The value of the polarity term component of the surface energy was calculated from the measurement of the contact angle for water and methylene iodide explained later using the above equation. The result was 0.8 erg/cm².

(4) Evaluation of Performance

The performances of the obtained optical products were evaluated by testing in accordance with the following methods.

The test results of the items evaluated from the following (a) to (e) and the calculated values of the dispersion component $\gamma^d$ and polar term component $\gamma^p$ of the surface energy are shown in Table 3 and Table 4. Further, to see the solvent resistance, similar tests were performed again after cleaning by ethanol. The obtained results are similarly shown in Table 3 and Table 4.

(a) Stain Resistance Test 5 ml of tapwater was dripped on the surface of the filter and allowed to stand at a room temperature atmosphere (25° C.±2° C.) for 48 hours. The surface was wiped by a cloth, then the residual state of the water drops was observed visually. When the water marks could be removed, the sample was judged "good" while when they could not be removed was judged as "poor".

(b) Surface Slip

The degree of drag when scratching the surface by a pencil (hardness: 3H) was evaluated. The criteria for judgement are indicated below:

Good: No drag at all.

Fair: Strong drag.

Poor: Drag, though weak.

(c) Abrasion Resistance Test

The surface of an optical product was rubbed with steel wool #0000 at a load of 200 g 30 times, then evaluated as to whether it was scratched. The criteria for judgement are indicated below:

Good: No scratches at all.

Fair: Fine scratches.

Poor: Remarkable scratches.

(d) Resistance to Hand Marks

The resistance to hand marks was evaluated visually. The criteria for judgement are indicated below:

Good: Do not stand out even if adhering.

Fair: Adhere, but can be easily removed.

Good: Adhere, then stand out.

(e) Contact Angle

The contact angles of water and methylene iodide were measured. The measurement was performed using a CA-A made by Kyowa Kaimen Kagakusha. The dispersion term component $\gamma^d$ and the polar term component $\gamma^p$ of the surface energy were calculated from these values. The values before and after cleaning the surface by ethanol were measured for the purpose of studying the stability with respect to solvents.

Examples 2 to 4

The exact same procedure as in Example 1 was performed to obtain optical products and evaluate their performances except that instead of the alkoxysilane compound 1 having a perfluoropolyether group in Table 1 in Example 1, an alkoxysilane compound 1 having a perfluoropolyether group and the compounds 2 to 4 in Table 1 were blended in ratios of 50/50. The results obtained are shown in Table 3.

Example 5

The exact same procedure as in Example 1 was performed to obtain an optical product and evaluate its performances except that instead of the drying conditions 4 of Table 2, the drying conditions 5 of Table 2 was used. The results obtained are shown in Table 4.

Example 6

The exact same procedure as in Example 1 was performed to obtain an optical product and evaluate its performances except that instead of the drying conditions 4 of Table 2, the drying conditions 6 of Table 2 was used. The results obtained are shown in Table 3 and Table 4.

Comparative Example 1

The performance of an optical product not using an alkoxysilane compound having a perfluoropolyether group of the composition 1 of Table 2 and long chain hydrocarbon group, that is, not coated with a surface modified film, was evaluated. The results obtained are shown in Table 3 and Table 4.

Comparative Example 2

The exact same procedure was performed to obtain an optical product and evaluate its performances except that the coating composition in Example 1 was coated without adding the hydrochloric acid and acetyl acetone as a catalyst and drying by the drying conditions 1 of Table 2. The results obtained are shown in Table 3 and Table 4.

Comparative Example 3

The exact same procedure as in Example 1 was performed to obtain an optical product and evaluate its performances except that the coating composition in Example 1 was coated without adding the hydrochloric acid and acetyl acetone as a catalyst and drying by the drying conditions 2 of Table 2. The results obtained are shown in Table 3 and Table 4.

Comparative Examples 4 to 9

The exact same procedure as in Example 1 was performed to obtain optical products and evaluate their performances except that the compounds 2 to 7 were used instead of the alkoxysilane compound 1 having the perfluoropolyether group of Table 1 of Example 1. The results obtained are shown in Table 3 and Table 4.

TABLE 1

Partially Fluorinated Hydrocarbon Based Lubrication Oil Used

| Lubrication oil | Structual formula |
|---|---|
| Compound 1 | $CF_3O(CFCF_2O)_lCF_2CONHC_3H_6Si(OC_2H_5)_3$ with $CF_3$ branch on the CFCF_2O unit |
| Compound 2 | $C_8F_{17}CH_2Si(OC_2H_5)_3$ |
| Compound 3 | $C_{12}H_{25}Si(OC_2H_5)_3$ |
| Compound 4 | $HO-Si(CH_3)_2O-(SiO)_n(CH_3)-Si(CH_3)_2-OH$ |
| Compound 5 | $C_{18}H_{37}N^+H_3O^-COCF_2O(CF_2CF_2O)_l(CF_2O)_mCF_2COO^-N^+H_3C_{18}H_{37}$ |
| Compound 6 | $C_{12}F_{25}(CH_2)_5COOCH_3$ |
| Compound 7 | $C_{12}F_{25}(CH_2)_5COOH$ |

TABLE 2

Drying Conditions

| | Temperature °C. | Humidity RH% | Time Hr |
|---|---|---|---|
| Drying conditions 1 | 25 | 60 | 1 |
| Drying conditions 2 | 25 | 60 | 3 |
| Drying conditions 3 | 25 | 60 | 5 |
| Drying conditions 4 | 25 | 60 | 12 |
| Drying conditions 5 | 25 | 60 | 1 |
| Drying conditions 6 | 25 | 60 | 1 |

TABLE 4

Results of Measurement of Durability

| | Stain resistance | | Surface slip | | Abrasion resistance test | | Resistance to hand marks | |
|---|---|---|---|---|---|---|---|---|
| | Before | After | Before | After | Before | After | Before | After |
| Ex. 1 | Good | Good | Good | Good | Good | Good | Good | Good |
| Ex. 2 | Good | Good | Good | Good | Good | Good | Good | Good |
| Ex. 3 | Good | Good | Good | Good | Good | Good | Good | Good |

TABLE 3

Contact Angle and Results of Surface Energy

| | Type of compound (compounds of Table 1) | Use of catalyst | Drying conditions (Table 2) | Surface energy erg/cm$^2$ | | | | Contact angle deg. | | | |
|---|---|---|---|---|---|---|---|---|---|---|---|
| | | | | Before ethanol cleaning | | After ethanol cleaning | | Before ethanol cleaning | | After ethanol cleaning | |
| | | | | $\gamma^p$ | $\gamma^p$ | $\gamma^p$ | $\gamma^p$ | $H_2O$ | $CH_2I_2$ | $H_2O$ | $CH_2I_2$ |
| Ex. 1 | Compound 1 | Yes | 4 | 9.6 | 1.2 | 9.6 | 1.2 | 113 | 95 | 112 | 95 |
| Ex. 2 | Compound 1:Compound 2 = 1:1 | Yes | 4 | 9.4 | 1.4 | 10.7 | 1.3 | 112 | 93 | 111 | 92 |
| Ex. 3 | Compound 1:Compound 3 = 1:1 | Yes | 4 | 10.6 | 1.5 | 11.1 | 1.4 | 110 | 92 | 110 | 91 |
| Ex. 4 | Compound 1:Compound 4 = 1:1 | Yes | 4 | 11.1 | 1.4 | 11.4 | 1.5 | 110 | 91 | 109 | 90 |
| Ex. 5 | Compound 1 | Yes | 5 | 10.9 | 1.1 | 10.7 | 1.3 | 112 | 92 | 111 | 92 |
| Ex. 6 | Compound 1 | Yes | 6 | 9.7 | 1.0 | 10.2 | 0.9 | 114 | 95 | 114 | 94 |
| Comp. Ex. 1 | — | — | — | 20.9 | 39.4 | — | — | 35 | 51 | — | — |
| Comp. Ex. 2 | Compound 1 | No | 1 | 20.5 | 10.8 | 21.0 | 14.8 | 77 | 64 | 70 | 61 |
| Comp. Ex. 3 | Compound 1 | No | 2 | 17.3 | 8.0 | 18.9 | 9.3 | 85 | 72 | 81 | 68 |
| Conp. Ex. 4 | Compound 2 | Yes | 4 | 20.5 | 3.8 | 17.4 | 19.3 | 92 | 69 | 67 | 66 |
| Comp. Ex. 5 | Compound 3 | Yes | 4 | 24.1 | 5.4 | 19.6 | 20.3 | 85 | 61 | 63 | 61 |
| Comp. Ex. 6 | Compound 4 | Yes | 4 | 23.2 | 4.9 | 19.8 | 13.6 | 87 | 63 | 73 | 64 |
| Comp. Ex. 7 | Compound 5 | Yes | 4 | 7.6 | 19.5 | 21.4 | 40.4 | 77 | 89 | 33 | 50 |
| Comp. Ex. 8 | Compound 6 | Yes | 4 | 29.4 | 9.3 | — | — | 73 | 48 | — | — |
| Comp. Ex. 9 | Compound 7 | Yes | 4 | 9.7 | 41.0 | — | — | 49 | 76 | — | — |

TABLE 4-continued

Results of Measurement of Durability

| | Stain resistance | | Surface slip | | Abrasion resistance test | | Resistance to hand marks | |
|---|---|---|---|---|---|---|---|---|
| | Before | After | Before | After | Before | After | Before | After |
| Ex. 4 | Good | Good | Good | Good | Good | Good | Good | Good |
| Ex. 5 | Good | Good | Good | Good | Good | Good | Good | Good |
| Ex. 6 | Good | Good | Good | Good | Good | Good | Good | Good |
| Comp. Ex. 1 | Poor | Poor | Poor | Poor | Poor | Poor | Poor | Poor |
| Comp. Ex. 2 | Poor | Poor | Poor | Fair | Good | Fair | Poor | Poor |
| Comp. Ex. 3 | Good | Poor | Good | Fair | Good | Good | Fair | Fair |
| Comp. Ex. 4 | Poor | Poor | Good | Fair | Fair | Poor | Fair | Poor |
| Comp. Ex. 5 | Poor | Poor | Good | Fair | Fair | Poor | Fair | Poor |
| Comp. Ex. 6 | Poor | Poor | Good | Fair | Fair | Poor | Fair | Poor |
| Comp. Ex. 7 | Poor | Poor | Good | Fair | Fair | Poor | Fair | Poor |
| Comp. Ex. 8 | Poor | Poor | Good | Fair | Fair | Poor | Fair | Poor |
| Comp. Ex. 9 | Poor | Poor | Good | Fair | Fair | Poor | Fair | Poor |

From the results of Table 3 and Table 4, when the polar term component $\gamma^p$ of the surface energy is less than 2.0 erg/cm$^2$, the stain resistance, surface slip, abrasion resistance test, and resistance to hand marks are excellent.

EFFECTS OF THE INVENTION

As explained above, the filter for a display device according to the present invention, by being covered with a surface modified film having a value of the polar term component of the surface energy of the surface of the one or more layers of antireflection films provided on the substrate of not more than 2.0 erg/cm$^2$, has the effect of prevention of stains such as hand marks and water marks and it is possible to provide an antireflection filter superior in slip and abrasion resistance. Therefore, the filter for a display device according to the present invention has the following effects:

(1) There is resistance to adhesion of finger marks, hand marks, and other marks and any marks made do not stand out. These effects are retained permanently.

(2) Even if water marks etc. adhere and are dried, they can be easily removed.

(3) The surface slip is excellent.

(4) There is resistance to adherence of dust and other dirt and the usefulness is good.

(5) There is durability against abrasion.

(6) It is possible to make the drying temperature after coating a low temperature of less than 50° C.

What is claimed is:

1. A filter for a display device comprising:
a substrate,
an outermost layer inorganic film provided on the substrate; and
a surface modified film provided on the outermost layer inorganic film, the surface modified film having a polar term component $\gamma^p$ of the surface energy of not more than 2.0 erg/cm$^2$.

2. A filter for a display device as set forth in claim 1, wherein said surface modified film is formed from a coating composition containing a water repellent group-containing alkoxysilane compound of the following formula (1):

$$R_f\{X\text{-}Si(OR_1)_3\}_j \qquad (1)$$

wherein $R_f$ is a water repellent group, X is a bivalent organic group, $R_1$ is a substituted or unsubstituted monovalent hydrocarbon group, and j is as 1 or 2.

3. A filter for a display device as set forth in claim 2, wherein said coating composition further comprises at least one compound selected from the group consisting of acids, bases, phosphoric acid ester, acetyl acetone, and β-diketone.

4. A filter for a display device as set forth in claim 2, wherein $R_f$ is selected from the group consisting of perfluoroalkyl group, perfluoropolyether group, partial fluorinated alkyl group, fluorine-containing organic group, and hydrocarbon group.

5. A filter for a display device as set forth in claim 2, wherein X is an unsubstituted or substituted bivalent hydrocarbon group.

6. A filter for a display device as set forth in claim 2, wherein the alkoxysilane compound has a number average molecular weight of 500 to 10,000.

7. A filter for a display device as set forth in claim 1, wherein said surface modified film is formed from a coating composition containing a silicone compound of the following general formula (2):

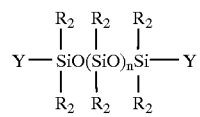

(2)

wherein Y is a polar group, $R_2$ is a substituted or unsubstituted monovalent hydrocarbon group, and n is an integer of 1 or more.

8. A filter for a display device as set forth in claim 7, wherein said coating composition further comprises at least one compound selected from the group consisting of acids bases, phosphoric acid ester, acetyl acetone, and β-diketone.

9. A filter for a display device as set forth in claim 7, wherein Y is selected from the group consisting of amino group, hydroxy group, carboxy group, epoxy group, ester group, alkoxy group, metacryloxy group, and imide group.

10. A filter for a display device as set forth in claim 7, wherein the silicone compound has a number average molecular weight of 1,000 to 10,000.

11. A filter for a display device as set forth in claim 1, wherein said outermost inorganic film is comprised mainly of silicon oxide.

12. A filter for a display device as set forth in claim 1, wherein the outermost layer comprises a single layer of inorganic film.

13. A filter for a display device as set forth in claim 1, wherein the outermost layer comprises multiple layers of inorganic films.

14. A filter for a display device as set forth in claim 1, wherein the surface energy is not more than 1.5 erg/cm$^2$.

15. A filter for a display device as set forth in claim 1, wherein the surface modified film has a thickness of 0.1 nm to 100 nm.

* * * * *